(12) United States Patent
Takeishi

(10) Patent No.: US 11,172,088 B2
(45) Date of Patent: Nov. 9, 2021

(54) MOVABLE POST PROCESSING UNIT OF RECORDING APPARATUS

(71) Applicant: SEIKO EPSON CORPORATION, Tokyo (JP)

(72) Inventor: Tetsuji Takeishi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/903,093

(22) Filed: Jun. 16, 2020

(65) Prior Publication Data

US 2020/0404116 A1 Dec. 24, 2020

(30) Foreign Application Priority Data

Jun. 18, 2019 (JP) .............................. JP2019-112559

(51) Int. Cl.
*H04N 1/21* (2006.01)
*H04N 1/00* (2006.01)
*G03G 15/00* (2006.01)

(52) U.S. Cl.
CPC ..... *H04N 1/00652* (2013.01); *G03G 15/6573* (2013.01); *H04N 1/0066* (2013.01); *H04N 1/00623* (2013.01); *B65H 2801/24* (2013.01); *B65H 2801/27* (2013.01); *G03G 15/6541* (2013.01); *G03G 15/6552* (2013.01); *G03G 15/6555* (2013.01)

(58) Field of Classification Search
None
See application file for complete search history.

(56) References Cited

U.S. PATENT DOCUMENTS

| | | | | |
|---|---|---|---|---|
| 9,836,006 B2* | 12/2017 | Dobashi | ................. | B65H 45/04 |
| 10,289,054 B2* | 5/2019 | Koyanagi | .......... | G03G 15/6582 |
| 2005/0051941 A1* | 3/2005 | Nagata | ............... | G03G 21/1638 270/58.08 |
| 2006/0204253 A1* | 9/2006 | Mae | .................... | G03G 15/6582 399/16 |
| 2009/0122355 A1* | 5/2009 | Awano | ............... | G03G 15/6582 358/401 |
| 2013/0082434 A1* | 4/2013 | Nishimura | ............. | B65H 29/56 271/5 |

(Continued)

FOREIGN PATENT DOCUMENTS

| | | |
|---|---|---|
| JP | 2014-006365 | 1/2014 |
| JP | 2019-182614 | 10/2019 |

*Primary Examiner* — Dung D Tran
(74) *Attorney, Agent, or Firm* — Workman Nydegger

(57) ABSTRACT

A recording apparatus includes an apparatus body including a recording section configured to record onto a medium and a discharge section configured to discharge the medium recorded by the recording section, and a post-processing unit attached to the apparatus body, the post-processing unit being configured to receive the medium discharged from the discharge section and perform post-processing. The post-processing unit is configured to be moved between a receiving position at which the medium discharged from the discharge section is to be received and a discharge position to which the post-processing unit is moved from the receiving position and at which the medium discharged from the discharge section is discharged to the outside of the post-processing unit without being received into the post-processing unit.

17 Claims, 11 Drawing Sheets

(56) References Cited

U.S. PATENT DOCUMENTS

| | | | |
|---|---|---|---|
| 2015/0050060 A1* | 2/2015 | Kim | B65H 31/22 |
| | | | 399/407 |
| 2015/0123339 A1 | 5/2015 | Akagawa | |
| 2018/0262631 A1* | 9/2018 | Nakata | H04N 1/00037 |
| 2019/0263619 A1* | 8/2019 | Tsuji | B65H 39/06 |
| 2019/0273833 A1* | 9/2019 | Sato | G03G 15/6552 |
| 2020/0180882 A1* | 6/2020 | Kubo | B65H 31/02 |

* cited by examiner

MOVABLE POST PROCESSING UNIT OF RECORDING APPARATUS

The present application is based on, and claims priority from JP Application Serial Number 2019-112559, filed Jun. 18, 2019, the disclosure of which is hereby incorporated by reference herein in its entirety.

BACKGROUND

1. Technical Field

The present disclosure relates to a recording apparatus that includes a post-processing unit for performing post-processing to recorded media.

2. Related Art

Recording apparatuses that include a post-processing section for performing post-processing such as stapling and punching to media are known. For example, the image forming apparatus described in JP-A-2014-6365 includes an apparatus body, a first processing unit, and a second processing unit. The apparatus body performs image formation processing onto a paper sheet. The first processing unit and the second processing unit are stacked in the vertical direction on the same side surface side of the apparatus body. The second processing unit is disposed on the first processing unit and the second processing unit can be slid toward or away from the apparatus body. The first processing unit supplies paper sheets one by one as needed, and the second processing unit performs post-processing to the sheets.

In the image forming apparatus discussed in JP-A-2014-6365, since the second processing unit can be slid toward or away from the apparatus body, a connection section between the second processing unit and the apparatus body can be released and thus workability is increased. With this structure, maintenance tasks such as removing a paper sheet can be readily performed when a transport failure occurs between the second processing unit and the apparatus body.

In the structure described in JP-A-2014-6365, however, the second processing unit can be slid toward or away from the apparatus body and the second processing unit is close to the apparatus body when the apparatus body is in operation, and a recorded paper sheet is always sent to the second processing unit. In this structure, depending on the paper sizes, even though the paper sheets can be recorded in the apparatus body, some of the paper sheets cannot be processed in the second processing unit due to the limitation of the second processing unit, and still there is room for improvement in usability.

SUMMARY

According to an aspect of the present disclosure, a recording apparatus includes an apparatus body including a recording section configured to record onto a medium and a discharge section configured to discharge the medium recorded by the recording section, and a post-processing unit attached to the apparatus body, the post-processing unit being configured to receive the medium discharged from the discharge section and perform post-processing. The post-processing unit is configured to be moved between a receiving position at which the medium discharged from the discharge section is to be received and a discharge position to which the post-processing unit is moved from the receiving position and at which the medium discharged from the discharge section is discharged to the outside of the post-processing unit.

DESCRIPTION OF EXEMPLARY EMBODIMENTS

Figure 1:
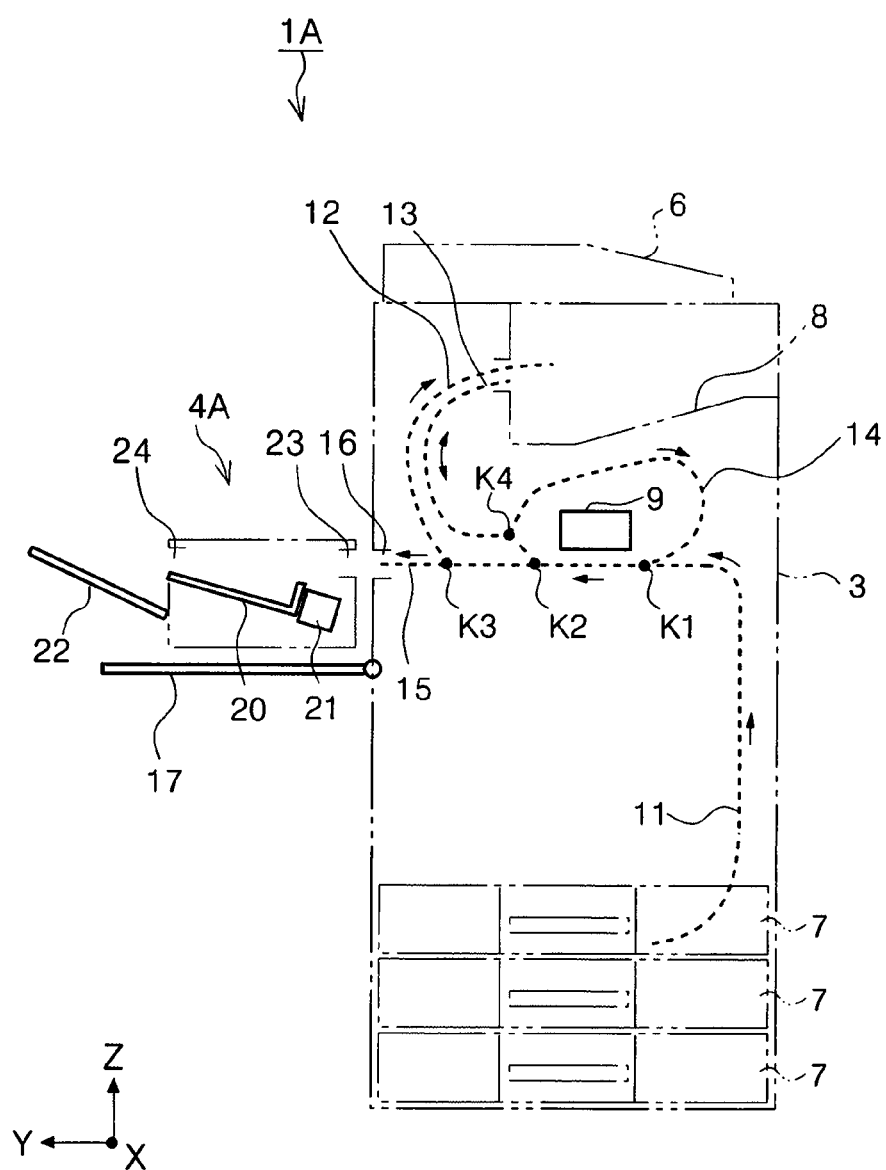
FIG. 1 schematically illustrates a structure of a recording apparatus according to a first embodiment.

Hereinafter, aspects of the present disclosure will be briefly described. A recording apparatus according to a first aspect includes and apparatus body including a recording section configured to record onto a medium and a discharge section configured to discharge the medium recorded by the recording section, and a post-processing unit attached to the apparatus body, the post-processing unit being configured to receive the medium discharged from the discharge section and perform post-processing. The post-processing unit is configured to be moved between a receiving position at which the medium discharged from the discharge section is to be received and a discharge position to which the post-processing unit is moved from the receiving position and at which the medium discharged from the discharge section is discharged to the outside of the post-processing unit without being received into the post-processing unit.

According to this aspect, the post-processing unit can be moved between a receiving position at which the medium discharged from the discharge section is to be received and a discharge position to which the post-processing unit is moved from the receiving position and at which the medium discharged from the discharge section is discharged to the outside of the post-processing unit without being received into the post-processing unit. With this structure, the post-processing unit is moved to the discharge position, and thus media of various sizes can be processed without medium size limitations due to the post-processing unit, and the usability can be increased.

In a second aspect, in the first aspect, the discharge position of the post-processing unit may be higher than the receiving position. According to this aspect, in the structure in which the discharge position of the post-processing unit is higher than the receiving position, the effect in the above-described first aspect can be obtained.

In a third aspect, in the second aspect, the post-processing unit may be configured to be moved from the receiving position in the direction in which the medium is discharged by the discharge section, and then moved upward to the discharge position. If the post-processing unit is moved upward while the medium is jammed between the apparatus body and the post-processing unit, the jammed medium may be torn. However, the post-processing unit according to the aspect is moved from the receiving position in the direction in which the medium is discharged by the discharge section, and then moved upward to the discharge position. Accordingly, when the post-processing unit is moved in the discharge direction, the user can visually check the medium that is jammed between the apparatus body and the post-processing unit and perform jam processing before the post-processing unit is moved toward the discharge position.

In a fourth aspect, in the first aspect, the discharge position of the post-processing unit may be lower than the receiving position. According to this aspect, in the structure in which the discharge position of the post-processing unit is lower than the receiving position, the effect in the above-described first aspect can be obtained.

In a fifth aspect, in the fourth aspect, the post-processing unit may be configured to be moved from the receiving position in the direction in which the medium is discharged by the discharge section, and then moved downward to the discharge position. If the post-processing unit is moved downward while the medium is jammed between the apparatus body and the post-processing unit, the jammed medium may be torn. However, the post-processing unit according to the aspect is moved from the receiving position in the direction in which the medium is discharged by the discharge section, and then moved downward to the discharge position. Accordingly, when the post-processing unit is moved in the discharge direction, the user can visually check the medium that is jammed between the apparatus body and the post-processing unit and perform jam processing before the post-processing unit is moved toward the discharge position.

In a sixth aspect, in the fourth or fifth aspect, when the post-processing unit is located at the discharge position, an upper surface of the post-processing unit may serve as a medium receiving surface that receives the medium that is discharged from the discharge section. According to this aspect, when the post-processing unit is located at the discharge position, an upper surface of the post-processing unit serves as a medium receiving surface that receives the medium that is discharged from the discharge section. With this structure, it is not necessary to provide a separate dedicated medium receiving section for receiving the medium that is discharged from the discharge section when the post-processing unit is located at the discharge position, and thus the cost for the apparatus can be reduced.

In a seventh aspect, in the sixth aspect, the discharge position of the post-processing unit may be lowered depending on a load of media stacked on the upper surface of the post-processing unit. According to this aspect, the discharge position of the post-processing unit is lowered depending on a load of media stacked on the upper surface of the post-processing unit. With this structure, the load of media to be stacked onto the upper surface of the post-processing unit can be ensured.

In an eighth aspect, in the first aspect, the discharge position of the post-processing unit may be located along the direction in which the medium is discharged from the discharge position with respect to the receiving position. According to this aspect, the discharge position of the post-processing unit is located along the direction in which the medium is discharged from the discharge position with respect to the receiving position. With this structure, leading edges of media discharged from the discharge position can be aligned by the post-processing unit.

In a ninth aspect, in the eighth aspect, the discharge position of the post-processing unit may be changed depending on the length of the medium in the direction in which the medium is discharged from the discharge section. According to this aspect, the discharge position of the post-processing unit is changed depending on the length of the medium in the direction in which the medium is discharged from the discharge section. With this structure, leading edges of media can be appropriately aligned by the post-processing unit.

In a tenth aspect, in any one of the first to ninth aspects, a controller configured to control the movement of the post-processing unit may be provided, and the controller may be configured to control the movement of the post-processing unit depending on the size of the medium. According to this aspect, a controller configured to control the movement of the post-processing unit is provided, and the controller is configured to control the movement of the post-processing unit depending on the size of the medium. With this structure, the usability can be further increased.

In an eleventh aspect, in the tenth aspect, when the medium of a size that is not processed in the post-processing unit is to be transported and the post-processing unit is located at the receiving position, the controller may cause the post-processing unit to move from the receiving position to the discharge position.

According to this aspect, when the medium of a size that is not processed in the post-processing unit is to be transported and the post-processing unit is located at the receiving position, the controller causes the post-processing unit to move from the receiving position to the discharge position. By this operation, an abnormal condition such as a jam of the medium can be prevented in the post-processing unit.

In a twelfth aspect, in the tenth aspect, the controller may set the receiving position as a home position of the post-processing unit. According to this aspect, the controller sets the receiving position as a home position of the post-processing unit. With this setting, the post-processing unit is normally located at the receiving position, and in receiving the medium into the post-processing unit, the time necessary to move the post-processing unit can be saved, and thus throughput can be increased. Furthermore, when the post-processing by the post-processing unit is not necessary, the medium can be discharged into the post-processing unit, and thus the time necessary to move the post-processing unit can be saved.

In a thirteenth aspect, in any one of the first to ninth aspects, a controller configured to control the movement of the post-processing unit may be provided, and the controller may be configured to control the movement of the post-processing unit depending on the content recorded by the recording section on the medium. According to this aspect, a controller configured to control the movement of the post-processing unit is provided, and the controller is configured to control the movement of the post-processing unit depending on the content recorded by the recording section on the medium. By this operation, when it is not necessary to perform the post-processing by the post-processing unit, the post-processing unit does not perform the post-processing, and thereby an appropriate result can be obtained.

In a fourteenth aspect, in the thirteenth aspect, the recording section may comprise a liquid discharge head configured to discharge a liquid onto the medium for recording, and when a duty value that is an amount of liquid to be applied per unit area by the liquid discharge head onto the medium exceeds a predetermined value, the controller may cause the post-processing unit to move to the discharge position to discharge the medium to the outside of the post-processing unit.

As the duty value increases, the medium deforms more easily and the post-post-processing may not be appropriately performed by the post-processing unit. In this aspect, when the duty value exceeds the predetermined value, the controller causes the post-processing unit to move to the discharge position to discharge the medium to the outside of the post-processing unit, and thus the above-described problem can be prevented or reduced.

In a fifteenth aspect, in any one of the first to ninth aspects, a controller configured to control the movement of the post-processing unit and a position detection unit configured to detect a position of the post-processing unit may be provided. When the controller determines, based on the information detected by the position detection unit, that the post-processing unit is located at a position between the receiving position and the discharge position, the controller may provide the information about the location.

According to this aspect, when the controller determines, based on the information detected by the position detection unit, that the post-processing unit is located at a position between the receiving position and the discharge position, the controller provides the information about the location. Consequently, abnormal conditions such as a jam due to discharging of the medium while the post-processing unit is in an inappropriate position can be prevented or reduced.

In a sixteenth aspect, in any one of the first to ninth aspects, a controller configured to control the movement of the post-processing unit and a position detection unit configured to detect a position of the post-processing unit may be provided. When the controller determines, based on the information detected by the position detection unit, that the post-processing unit is located at a position between the receiving position and the discharge position, the controller may cause the post-processing unit to move to the receiving position or the discharge position.

According to this aspect, when the controller determines, based on the information detected by the position detection unit, that the post-processing unit is located at a position between the receiving position and the discharge position, the controller causes the post-processing unit to move to the receiving position or the discharge position. Consequently, abnormal conditions such as a jam due to discharging of the medium while the post-processing unit is in an inappropriate position can be prevented or reduced.

Hereinafter, embodiments of the present disclosure will be described in detail. The X-Y-Z coordinate system in the drawings is a rectangular coordinate system, in which the X-axis direction denotes a medium width direction and also denotes an apparatus depth direction. The Y-axis direction denotes an apparatus width direction and the Z-axis direction denotes a vertical direction, that is, an apparatus height direction. In the drawings, like reference numerals have been used to designate like elements, and overlapping descriptions will be omitted in the following descriptions. In FIG. 1, FIG. 2, and FIG. 5 to FIG. 7, the chain double-dashed lines denote generally outlined apparatus housings, and the broken lines denote paths through which a medium passes.

First Embodiment

Figure 2:
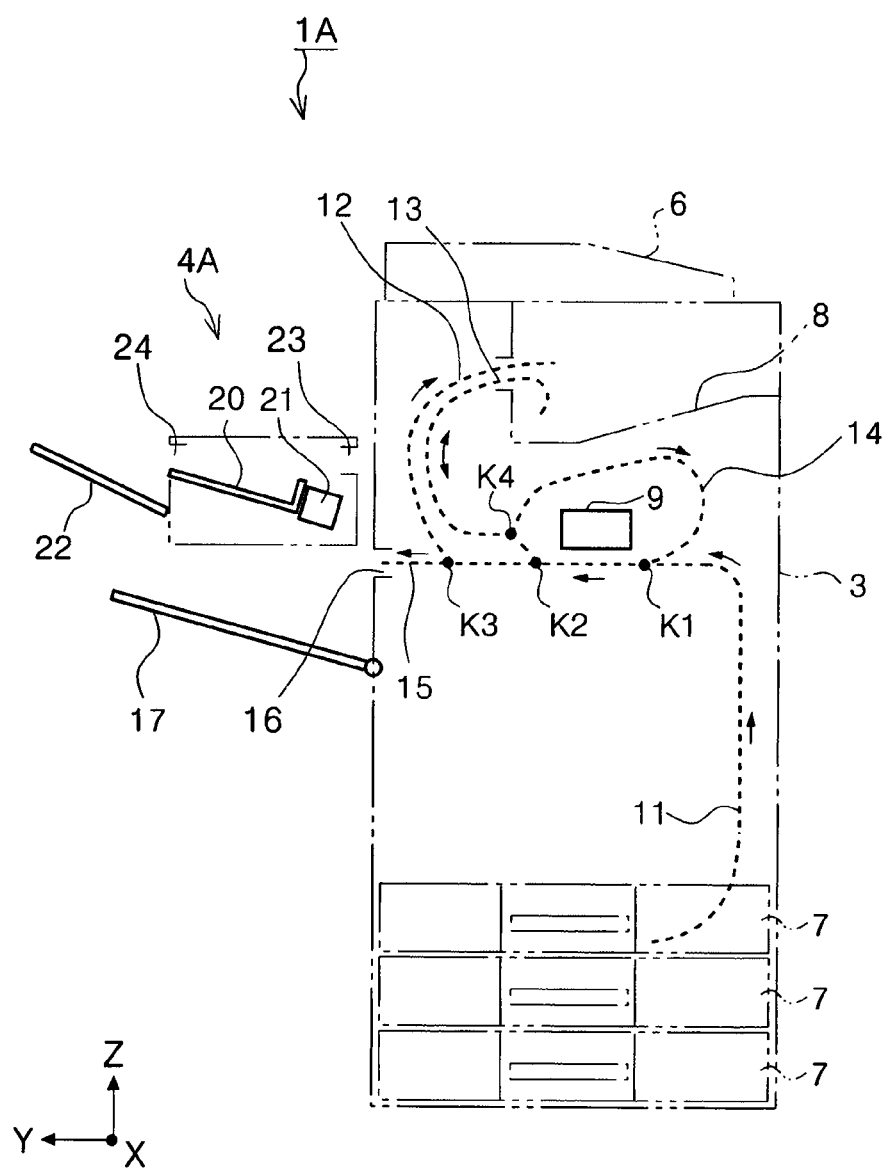
FIG. 2 schematically illustrates a structure of the recording apparatus according to the first embodiment.

A first embodiment will be described with reference to FIG. 1 to FIG. 3. In FIG. 1 and FIG. 2, a recording apparatus 1A is an example recording apparatus that records onto a medium. The recording apparatus 1A includes, in the apparatus body 3, a line head 9 that serves as a recording section for recording onto a medium. The line head 9 is an example liquid discharge head that discharges a liquid, more specifically, discharges an ink onto a medium for recording. The line head 9 extends in the X-axis direction and discharges an ink onto a medium without moving in the X-axis direction. The medium may be, for example, recording paper, and in the following description, the medium is referred to as a medium P.

The recording apparatus 1A includes a scanner unit 6 for reading a document, and the scanner unit 6 is disposed on an apparatus body 3, that is, the recording apparatus 1A is a so-called multifunction peripheral. The recording apparatus 1A further includes, on a side of the apparatus body 3 in the +Y direction, a post-processing unit 4A that receives a recorded medium P from the recording apparatus 1A and performs post-processing to the recorded medium P. The recording apparatus 1A includes medium cassettes 7 in a lower part of the apparatus body 3. A medium P stored in the medium cassette 7 is transported through a feeding path 11 to a position that faces the line head 9, and recording is performed at the position. The feeding path 11 is a path from the medium cassette 7 to a branch point K1.

The medium P on which recording has been performed by the line head 9 is fed through a face-down discharge path 12 and discharged onto a face-down discharge tray 8, or is fed through a face-up discharge path 15 and discharged from a discharge section 16 in the +Y direction. The face-down discharge path 12 is a path that extends upward from a branch point K3, and the face-up discharge path 15 is a path that extends in the +Y direction from the branch point K3. The medium P that is fed through the face-up discharge path 15 and discharged from the discharge section 16 in the +Y direction is discharged onto a face-up discharge tray 17 or received by the post-processing unit 4A. In FIG. 1 and FIG. 2, at branch points K1, K2, K3, and K4, the destination of a medium P is branched. In FIG. 1 and FIG. 2, each of the arrows given to the paths indicates a direction in which a medium P is fed.

The recording apparatus 1A includes a switchback path 13 and a reversing path 14, and after recording onto a first side of a medium P, the recording apparatus 1A can reverse the medium P to record onto a second side, that is, two-sided recording can be performed. The switchback path 13 is a path that extends downstream from the branch point K4, and the reversing path 14 is a path that extends from the branch point K4 to the branch point K1. To perform recording onto a second side of a medium P after recording onto a first side of the medium P, the medium P is fed upward from the branch point K2 through the branch point K4 toward the switchback path 13.

The medium P that has been fed to the switchback path 13 is further fed in a reverse direction through the branch point K4 to the reversing path 14. The medium P that has been fed to the reversing path 14 is fed to the position that faces the line head 9 through the branch point K1, and recording is performed onto the second side that is the opposite side of the first side onto which recording has been performed. The recorded medium P is fed from the branch point K3 to the face-down discharge path 12 or the face-up discharge path 15. At each of the branch points K2, K4, and K3, a path switching flap (not illustrated) is disposed, and the path switching flap changes its orientation to guide a medium P in a direction of the destination as necessary. On each path, a transport roller pair (not illustrated) is appropriately disposed.

The post-processing unit 4A includes a processing tray 20 and a stack tray 22. The post-processing unit 4A performs post-processing by using a post-processing unit 21 to a medium P that has been discharged onto the processing tray 20, and discharges the medium P onto the stack tray 22. The post-processing to be performed by the post-processing unit 21 includes, for example, stapling processing and punching processing. The post-processing unit 4A receives media P discharged from the discharge section 16 of the apparatus body 3 through a receiving section 23 onto the processing tray 20, performs post-processing, and the discharges the processed media P from a discharge section 24 onto the stack tray 22.

The post-processing unit 4A can be moved between a receiving position (see FIG. 1) at which a medium P discharged from the discharge section 16 in the apparatus body 3 is received and a discharge position (see FIG. 2) to which the post-processing unit 4A is moved from the receiving position and at which a medium P discharged from the discharge section 16 is not received into the post-processing unit 4A and discharged to the outside of the post-processing unit 4A. In this embodiment, the discharge position is higher than the receiving position. When the post-processing unit 4A is located at the receiving position illustrated in FIG. 1, the discharge section 16 of the apparatus body 3 and the receiving section 23 of the post-processing unit 4A are located at approximately the same height, and a medium P discharged from the discharge section 16 is received from the receiving section 23 into the post-processing unit 4A. When the post-processing unit 4A is located at the discharge position illustrated in FIG. 2, the position of the post-processing unit 4A is higher than the position of the discharge section 16 of the apparatus body 3, and a medium P discharged from the discharge section 16 is discharged to the outside of the post-processing unit 4A, more specifically, onto the face-up discharge tray 17. With this structure, the post-processing unit 4A is moved to the discharge position illustrated in FIG. 2, and thus media P of various sizes can be processed without the limitations in size of media P due to the post-processing unit 4A, improving the usability. In this embodiment, the lengths of media P in the Y-axis direction that can be discharged onto the face-up discharge tray 17 is longer than the lengths of media P in the Y-axis direction that can be received by the post-processing unit 4A.

Figure 3:
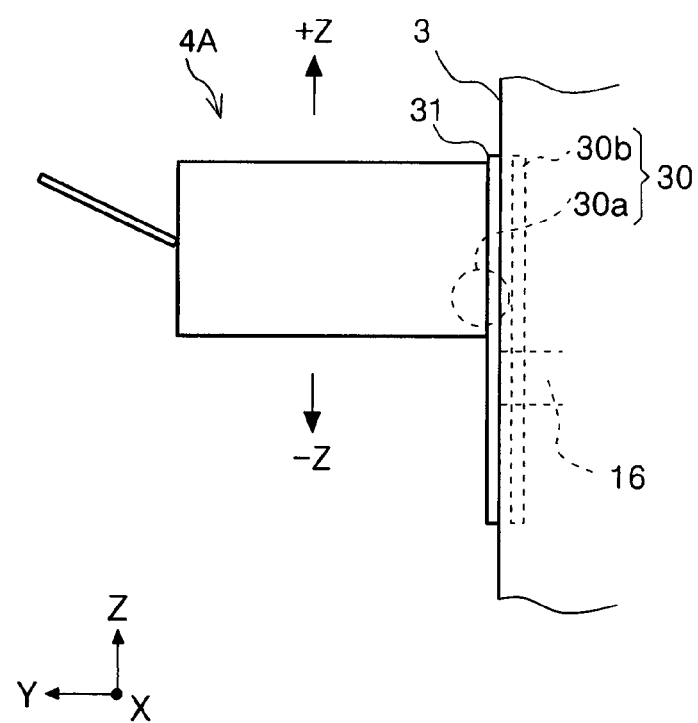
FIG. 3 illustrates a drive mechanism for driving a post-processing unit according to the first embodiment.

The structure that enables the post-processing unit 4A to be moved with respect to the apparatus body 3 may employ a structure illustrated in FIG. 3. In FIG. 3, a linear guide 31 extends in the Z-axis direction on a side of the apparatus body 3 in the +Y direction. The post-processing unit 4A can be moved along the linear guide 31 in the Z-axis direction with respect to the apparatus body 3. In FIG. 3, a drive mechanism 30 drives the post-processing unit 4A along the z-axis direction. The drive mechanism 30 is a so-called rack-pinion mechanism that includes a pinion 30a that is provided in the post-processing unit 4A and a rack 30b that is provided in the apparatus body 3. In FIG. 3, the pinion 30a receives the power of a motor (not illustrated) and rotates to move the post-processing unit 4A in the +Z direction or the −Z direction.

In this embodiment, the face-up discharge tray 17 disposed in the apparatus body 3 is horizontally oriented when the post-processing unit 4A is located at the receiving position illustrated in FIG. 1 such that the face-up discharge tray 17 does not interfere with the post-processing unit 4A. When the post-processing unit 4A is located at the discharge position illustrated in FIG. 2, the face-up discharge tray 17 is oriented upward in the +Y direction such that a medium P that is discharged in the +Y direction is not discharged beyond the face-up discharge tray 17. In this embodiment, when the post-processing unit 4A is located at the receiving position illustrated in FIG. 1, the face-up discharge tray 17 does not in contact with the post-processing unit 4A, however, for example, the post-processing unit 4A may be supported by the face-up discharge tray 17.

Second Embodiment

Figure 4:
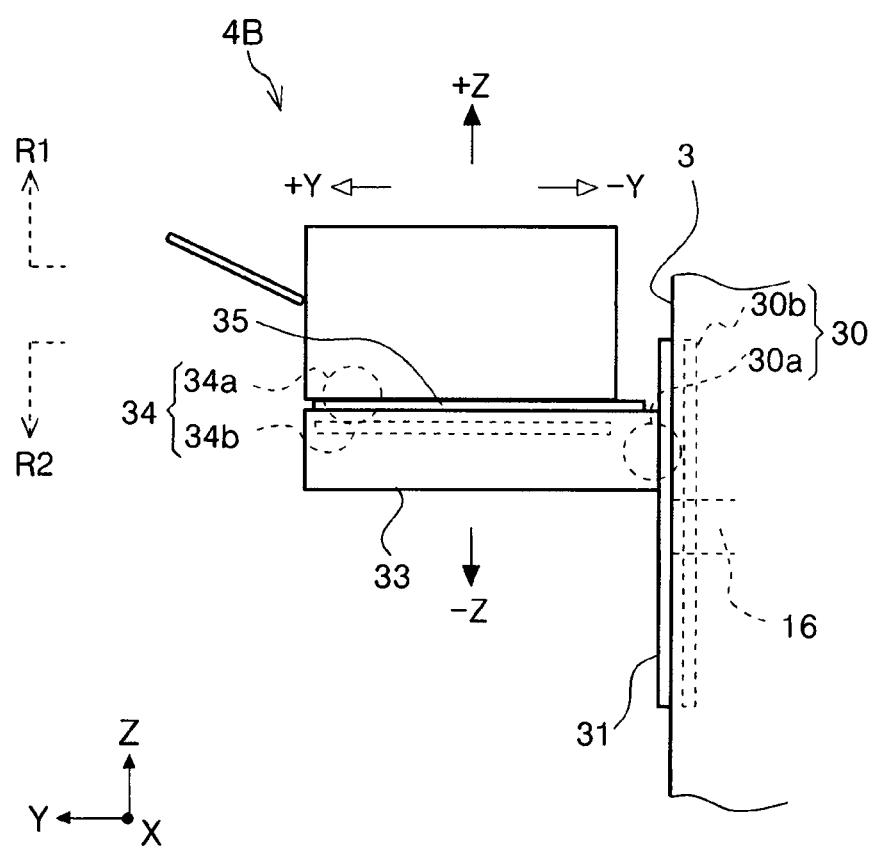
FIG. 4 illustrates a drive mechanism for driving a post-processing unit according to a second embodiment.

A second embodiment will be described with reference to FIG. 4. A post-processing unit 4B illustrated in FIG. 4 is different from the above-described post-processing unit 4A in that the post-processing unit 4B is moved from the receiving position in the direction in which a medium P is discharged by the discharge section 16, that is, in the +Y direction, and then moved upward, that is, in the +Z direction to the discharge position. In FIG. 4, arrow R1 shown by the broken line indicates a movement trajectory of the post-processing unit 4B that is moved from the receiving position to the discharge position. For example, if the post-processing unit 4B is moved upward while a medium P is jammed between the apparatus body 3 and the post-processing unit 4B, the jammed medium P may be torn. However, the post-processing unit 4B according to the embodiment is moved as indicated by the movement trajectory R1 from the receiving position in the direction in which the medium P is discharged by the discharge section 16, that is, in the +Y direction, and then moved upward, that is, in the +Z direction to the discharge position. Accordingly, when the post-processing unit 4B is moved in the +Y direction, the user can visually check the medium P that is jammed between the apparatus body 3 and the post-processing unit 4B and perform jam processing before the post-processing unit 4B is moved toward the discharge position.

The post-processing unit 4B according to the embodiment is disposed on a base section 33, and the base section 33 can be moved in the Z-axis direction similarly to the linear guide 31 and the drive mechanism 30 according to the embodiment illustrated in FIG. 3. Furthermore, the post-processing unit 4B can be moved in the Y-axis direction by using the linear guide 35 with respect to the base section 33 and the driving force to move the post-processing unit 4B in the Y-axis direction is applied by the drive mechanism 34. The drive mechanism 34 is disposed in the post-processing unit 4B and is a so-called rack-pinion mechanism that includes a pinion 34a that is driven to rotate by a motor (not illustrated) in FIG. 4 and a rack 34b that is provided in the base section 33. The pinion 34a rotates to move the post-processing unit 4B in the +Y direction or the −Y direction with respect to the base section 33.

Third Embodiment

Figure 5:
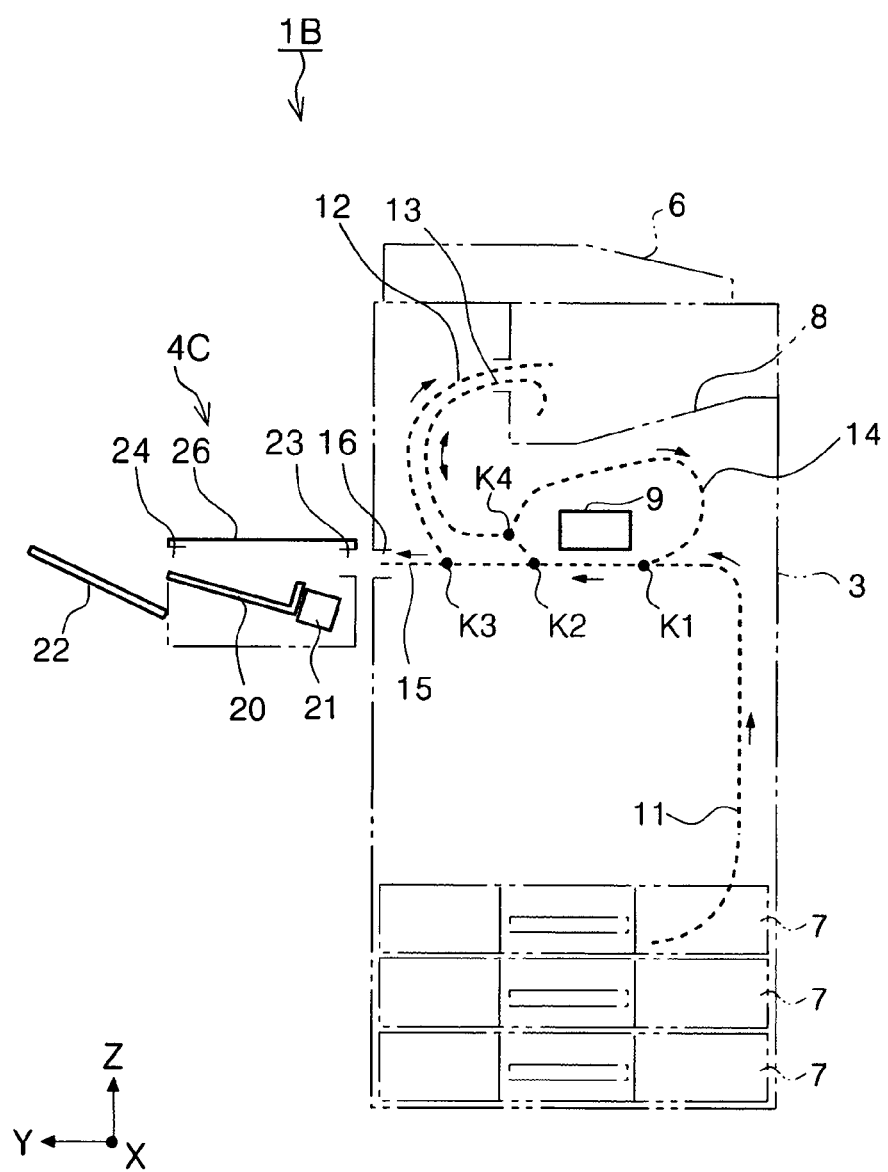
FIG. 5 schematically illustrates a structure of a recording apparatus according to a third embodiment.
Figure 6:
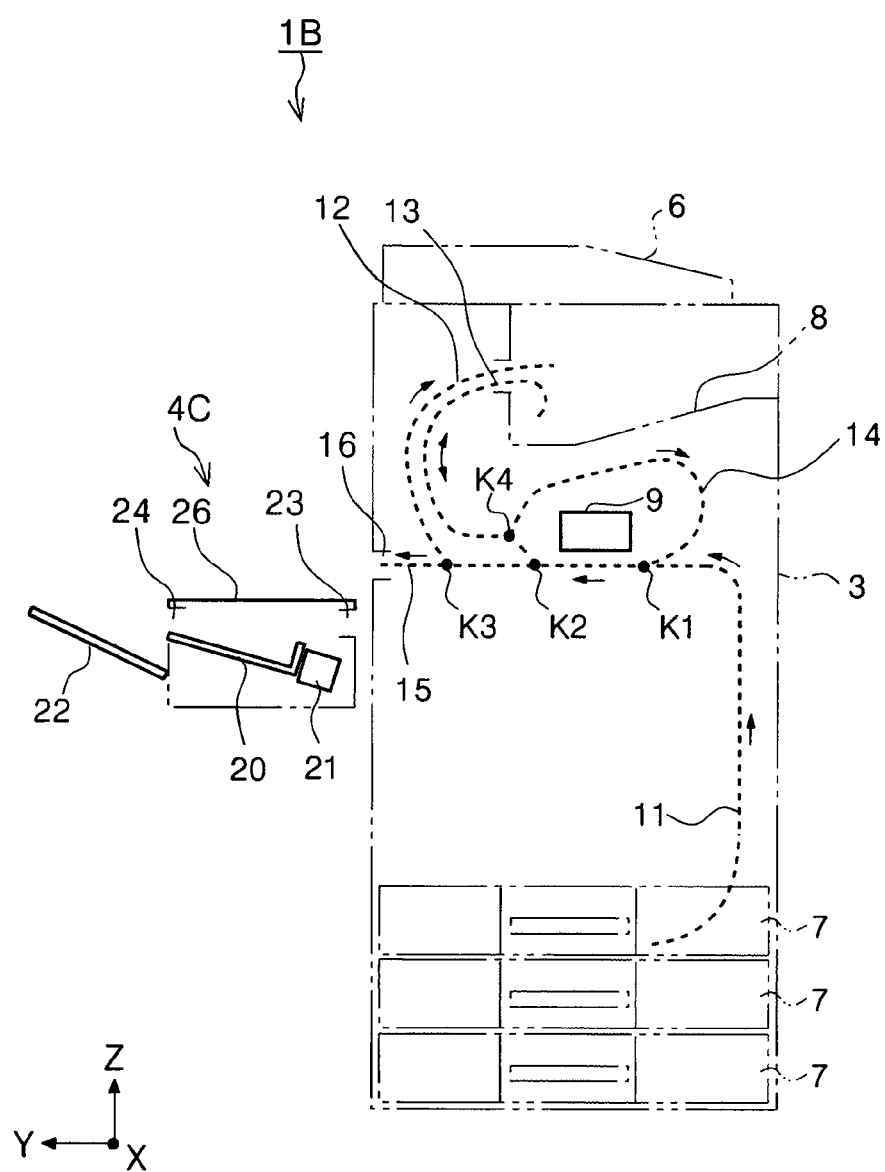
FIG. 6 schematically illustrates a structure of a recording apparatus according to the third embodiment.
Figure 7:
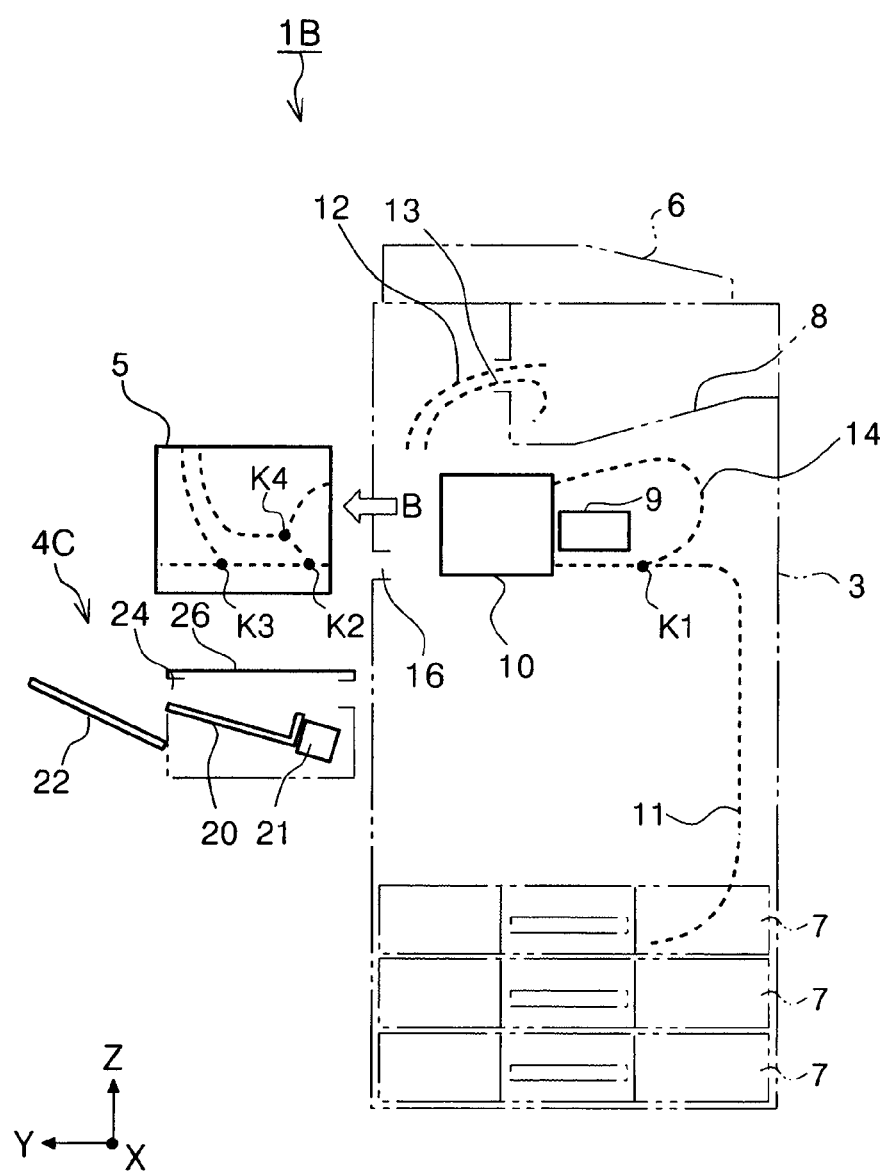
FIG. 7 schematically illustrates a structure of a recording apparatus according to the third embodiment.

A third embodiment will be described with reference to FIG. 5 to FIG. 7. A recording apparatus 1B illustrated in FIG. 5 to FIG. 7 is different from the above-described recording apparatus 1A in that a discharge position of a post-processing unit 4C is lower than a receiving position. FIG. 5 illustrates the receiving position of the post-processing unit 4C, and FIG. 6 and FIG. 7 illustrate the discharge position of the post-processing unit 4C. As illustrated in the drawings, a mechanism similar to that illustrated in FIG. 3 may be employed for the mechanism for moving the post-processing unit 4C in the Z-axis direction. In this embodiment, when the post-processing unit 4C is in the discharge position illustrated in FIG. 6, an upper surface 26 of the post-processing unit 4C serves as a medium receiving surface that receives a medium P that is discharged from the discharge section 16. With this structure, the face-up discharge tray 17 illustrated in FIG. 1 and FIG. 2 can be eliminated, and the cost for the apparatus can be reduced. The third embodiment may be modified such that as previously described with reference to FIG. 4, the post-processing unit 4C may be moved in the +Y direction before being moved to the discharge position, and then moved to the lower discharge position. The trajectory of the movement of the post-processing unit 4C in this operation is indicated by trajectory R2 in FIG. 4. As illustrated in the drawings, a mechanism similar to that illustrated in FIG. 4 may be employed for the mechanism for moving the post-processing unit 4C.

The discharge position of the post-processing unit 4C illustrated in FIG. 6 may be lowered depending on a load of media P that are stacked on the upper surface 26 of the post-processing unit 4C. With this structure, the load of media P to be stacked onto the upper surface 26 of the post-processing unit 4C can be ensured. Furthermore, the upper surface 26 may be oriented upward in the +Y direction such that a medium P that is discharged in the +Y direction is not discharged beyond the upper surface 26.

The recording apparatus 1B includes a transport unit 5 and the transport unit 5 is configured to be slid in the +Y direction to the outside of the apparatus body 3 as illustrated in FIG. 7. The transport unit 5 includes the above-described branch points K2, K3, K4, and the medium transport paths around the branch points, and by pulling the transport unit 5 out of the apparatus body 3 as illustrated in arrow B, a jammed medium P can be readily removed. The apparatus body 3 has an opening/closing cover (not illustrated), and the opening/closing cover is opened to expose an opening 10 through which a user can readily access the inside of the apparatus body 3. With this structure, when a jammed medium P remains inside the apparatus body 3 while the transport unit 5 is pulled out, the medium P can be readily removed. In this embodiment, the post-processing unit 4C is moved to the discharge position to enable the transport unit 5 to be pulled out from the apparatus body 3. Similarly, in the recording apparatus 1A illustrated in FIG. 1 and FIG. 2, the discharge position in FIG. 2 may be provided at a higher position to provide a similar structure.

Fourth Embodiment

Figure 8:
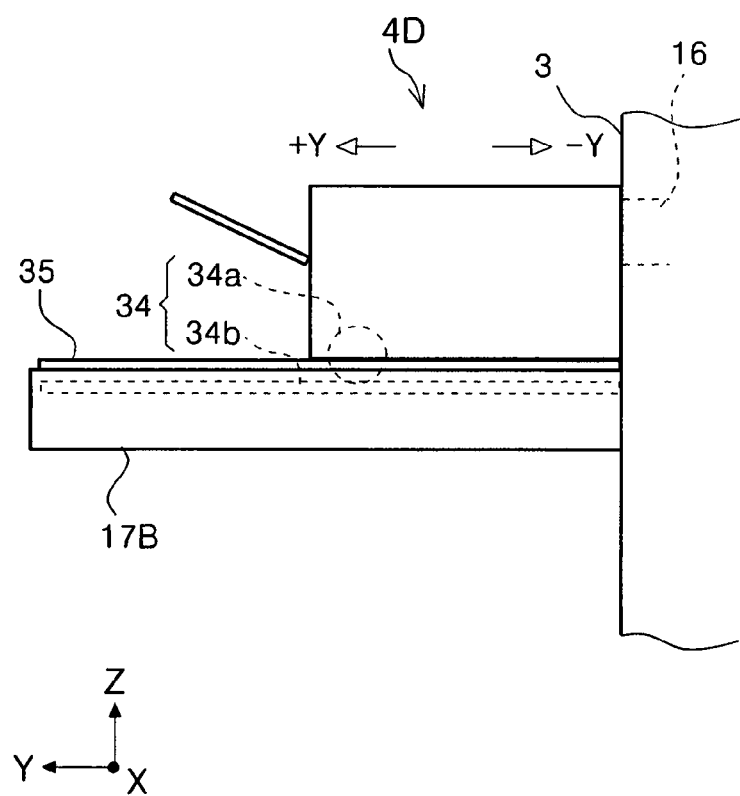
FIG. 8 illustrates a post-processing unit according to a fourth embodiment.
Figure 9:
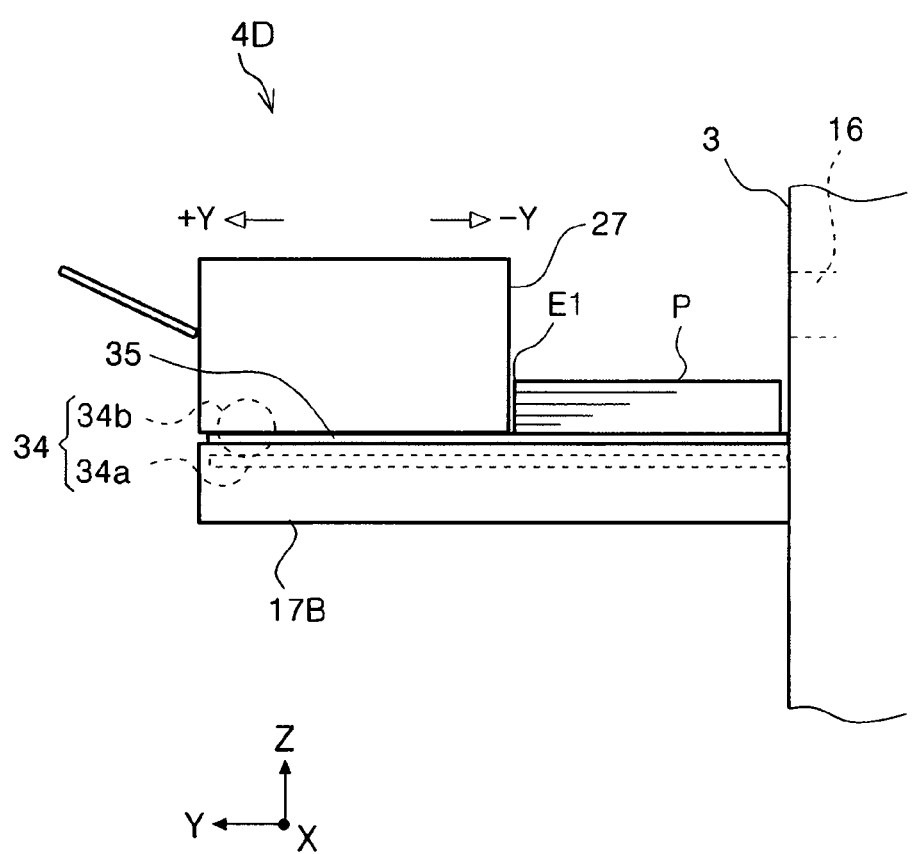
FIG. 9 illustrates a post-processing unit according to the fourth embodiment.

A fourth embodiment will be described with reference to FIG. 8 to FIG. 9. A post-processing unit 4D illustrated in FIG. 8 and FIG. 9 is different from the above-described embodiments in that a discharge position is located at a position in the direction in which a medium P is discharged from the discharge section 16 with respect to a receiving position, that is, in the +Y direction. FIG. 8 illustrates the post-processing unit 4D in the receiving position, and FIG. 9 illustrates the post-processing unit 4D in the discharge position. In FIG. 8 and FIG. 9, a face-up discharge tray 17B is disposed on a side surface of the apparatus body 3 in the +Y direction. As illustrated in FIG. 9, when the post-processing unit 4D is in the discharge position, media P discharged from the discharge section 16 are stacked on the face-up discharge tray 17B. A drive mechanism 34 drives the post-processing unit 4D along the Y-axis direction, and the structure is similar to that described above with reference to FIG. 4.

When the post-processing unit 4D is in the discharge position illustrated in FIG. 9, leading edges E1 of media P discharged from the discharge section 16 collide with a side surface of the post-processing unit 4D in the −Y direction, that is, a back face 27. With this structure, the leading edges E1 of the media P discharged from the discharge section 16 can be aligned by the back face 27 of the post-processing unit 4D.

In this structure, the discharge position of the post-processing unit 4D illustrated in FIG. 9 may be changed depending on the length in the discharge direction of a medium P to be discharged from the discharge section 16. With this structure, the leading edges E1 of media P can be appropriately aligned by the post-processing unit 4D.

Movement Control for Post-processing Unit

Figure 10:
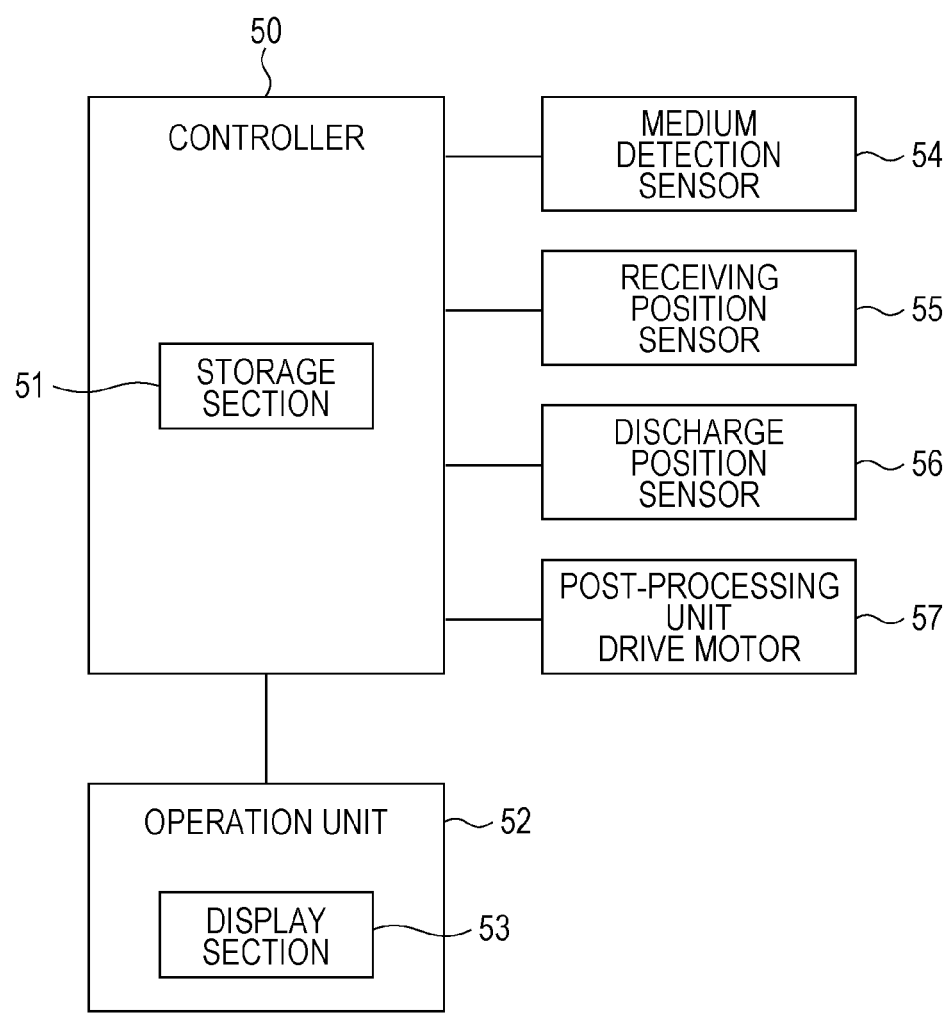
FIG. 10 is a block diagram illustrating a control system in a recording apparatus.
Figure 11:
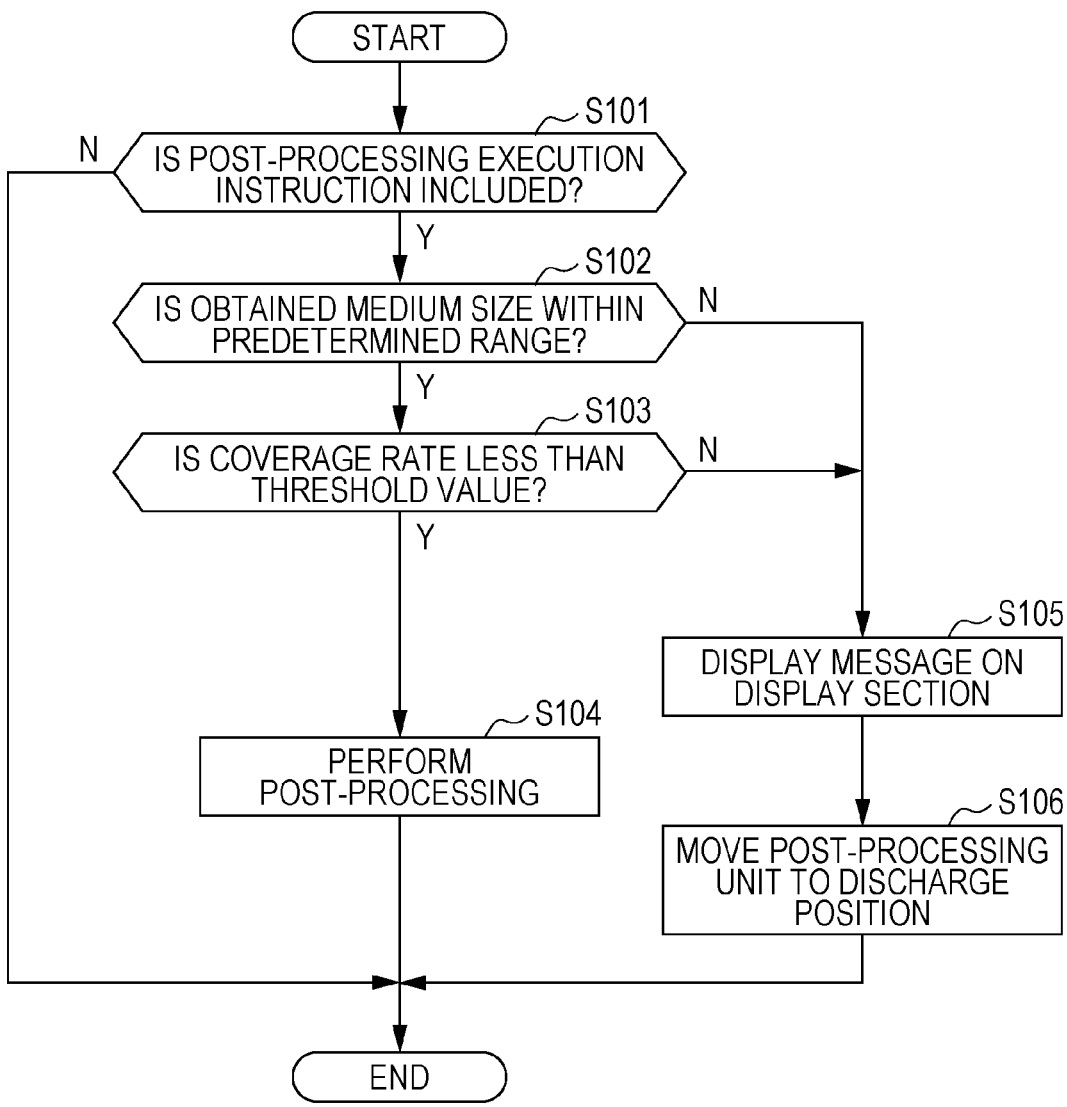
FIG. 11 is a flowchart illustrating processing for controlling the movement of a post-processing unit.

Hereinafter, based on the structure of the recording apparatus 1A according to the first embodiment described with reference to FIG. 1 and FIG. 2, processing for controlling the movement of the post-processing unit 4A will be described with reference to FIG. 10 and FIG. 11. In FIG. 10, a controller 50 is provided in the apparatus body 3. The controller 50 is used to generate print data based on information input from an operation unit 52 that is operated by a user and control the components in the apparatus body 3 and the post-processing unit 4A. The controller 50 includes a storage section 51, and the storage section 51 stores various programs, various parameters, and other information necessary for the control of the apparatus body 3 and the post-processing unit 4A.

To the controller 50, information from various sensors disposed in the apparatus body 3 and the post-processing unit 4A is input. FIG. 10 illustrates, as examples of the sensors, a medium detection sensor 54, a receiving position sensor 55, and a discharge position sensor 56. The medium detection sensor 54 is disposed, for example, at a position on an upstream side of the line head 9 close to the line head 9, and detects the passage of a leading edge and a trailing edge of a medium P. Based on the detection information from the medium detection sensor 54, the controller 50 determines the length of the medium P that is currently transported in the transport direction. The receiving position sensor 55 is turned on when the post-processing unit 4A is in the receiving position (see FIG. 1), and is turned off when the post-processing unit 4A is in a position other than the receiving position. The discharge position sensor 56 is turned on when the post-processing unit 4A is in the discharge position (see FIG. 2), and is turned off when the post-processing unit 4A is in a position other than the discharge position. The receiving position sensor 55 and the discharge position sensor 56 serve as a position detector that detects a position of the post-processing unit 4A.

Accordingly, when both of the receiving position sensor 55 and the discharge position sensor 56 are turned off, the controller 50 determines that the post-processing unit 4A is located at a position between the receiving position and the discharge position. In the description below, for convenience, a position of the post-processing unit 4A between the receiving position and the discharge position is referred to as an "incomplete position". A post-processing unit drive motor 57 is a drive source of the pinion 30a, which has been described with reference to FIG. 3, and the controller 50 drives the post-processing unit drive motor 57 to move the post-processing unit 4A.

When the controller 50 determines that the post-processing unit 4A is located at an incomplete position based on detection signals from the receiving position sensor 55 and the discharge position sensor 56, the controller 50 can provide the information that the post-processing unit 4A is located at an incomplete position. The information may be displayed, for example, as a warning message by using a display section 53. For example, the warning message may include a message that the post-processing unit 4A is located at an incomplete position, and a message that urges a user to determine to move the post-processing unit 4A to the receiving position or to the discharge position. By the information, it can be expected that the user will input an instruction to move the post-processing unit 4A to the receiving position or the discharge position, and thus abnormal conditions such as a jam due to discharging of a medium P while the post-processing unit 4A is in an incomplete position can be prevented. Instead of the information, or in addition to the information, when the controller 50 determines that the post-processing unit 4A is located at an incomplete position, the controller 50 may drive the post-processing unit drive motor 57 to move the post-processing unit 4A to the receiving position or the discharge position. By the operation, usability can be further increased.

In this configuration, for the post-processing unit 4A, a home position may be set to the receiving position or the discharge position, and in such a case, the post-processing unit 4A is moved to the position set as the home position. When a print job is started or after a print job is started, if it is determined that the post-processing unit 4A is located at an incomplete position, the post-processing unit 4A may be moved to a position appropriate for the print job. Specifically, for example, when a medium P of a size that cannot be processed in the post-processing unit 4A is to be transported, the post-processing unit 4A may be moved to the discharge position, and in other cases, the post-processing unit 4A may be moved to the receiving position. Alternatively, for example, if it is not appropriate to transport a medium P to the post-processing unit 4A due to a factor other than the size of the medium P, the post-processing unit 4A may be moved to the discharge position, and in other cases, the post-processing unit 4A may be moved to the receiving position.

The movement of the post-processing unit 4A in accordance with a print job will be further described below. The controller 50 controls the movement of the post-processing unit 4A depending on the size of a medium P. This further increases the usability. Specifically, for example, when a medium P of a size that cannot be processed in the post-processing unit 4A is to be transported and the post-processing unit 4A is located at the receiving position, the controller 50 causes the post-processing unit 4A to move from the receiving position to the discharge position. By this operation, an abnormal condition such as a jam of the medium P can be prevented in the post-processing unit 4A. The controller 50 sets the receiving position as the home position of the post-processing unit 4A. With this setting, the post-processing unit 4A is normally located at the receiving position, and in receiving a medium P into the post-processing unit 4A, the time necessary to move the post-processing unit 4A can be saved, and thus throughput can be increased. When the post-processing by the post-processing unit 4A is not necessary, a medium P can be discharged into the post-processing unit 4A, and thus the time necessary to move the post-processing unit 4A can be saved.

The controller 50 controls the movement of the post-processing unit 4A depending on the content recorded by the line head 9 on a medium P. By this operation, when it is not necessary to perform the post-processing for the medium P by the post-processing unit 4A, the post-processing unit 4A does not perform the post-processing, and thereby an appropriate result can be obtained. More specifically, when a duty value that is an amount of ink to be applied per unit area by the line head 9 onto a medium P exceeds a predetermined threshold value, the controller 50 causes the post-processing unit 4A to move to the discharge position to discharge the medium P to the outside of the post-processing unit 4A. As the duty value increases, the medium P deforms more easily and the post-processing may not be appropriately performed by the post-processing unit 4A. However, when the duty value exceeds the predetermined threshold value as in the above-described case, the post-processing unit 4A can be located at the discharge position and the medium P can be discharged outside the post-processing unit 4A, and thus the above-described problem can be prevented.

Hereinafter, the processing will be described in detail with reference to FIG. 11. When a print job includes a post-processing execution instruction (YES in step S101), the controller 50 goes to step S102. In step S102, the controller 50 determines whether the size of a medium P obtained by the medium detection sensor 54 is within a predetermined range. When the controller 50 determines that the size of the medium P is within the predetermined range (YES in step S102), the processing proceeds to step S103. In step S103, the controller 50 determines whether a duty value is less than a predetermined threshold value. When the duty value is less than the predetermined threshold value (YES in step S103), the controller 50 causes the post-processing unit 4A to perform the post-processing (step S104).

On the other hand, when the controller 50 determines that the size of the medium P obtained by the medium detection sensor 54 is beyond the predetermined range (NO in step S102) or the duty value is greater than or equal to the predetermined threshold value (NO in step S103), the controller 50 causes the display section 53 to display a message that says the print job cannot be processed in the post-processing (step S105), and then, the controller 50 causes the post-processing unit 4A to move to the discharge position (step S106). By this operation, an abnormal condition such as a jam of the medium P can be prevented in the post-processing unit 4A. In the above description, based on the structure of the recording apparatus 1A according to the first embodiment, the movement control for the post-processing unit 4A has been described. However, it is to be understood that similar control processing may be employed in the other embodiments.

Furthermore, it is to be understood that the present disclosure is not limited to the above-described embodiments, various modifications can be made within the scope of the following claims, and these modifications are included within the scope of the disclosure.

What is claimed is:
1. A recording apparatus comprising:
    an apparatus body including:
        a recording section configured to record onto a medium;
        a discharge section configured to discharge the medium recorded by the recording section; and
        a linear guide that extends substantially vertically; and
    a post-processing unit attached to the apparatus body, the post-processing unit being configured to move vertically downward along the linear guide and receive the medium discharged from the discharge section and perform post-processing, wherein:

the post-processing unit is configured to be moved between a receiving position at which the medium discharged from the discharge section is to be received and a discharge position to which the post-processing unit is moved from the receiving position and at which the medium discharged from the discharge section is discharged to an outside of the post-processing unit without being received into the post-processing unit; and the discharge position of the post-processing unit is lower than the receiving position.

2. The recording apparatus according to claim 1, wherein the post-processing unit is configured to be moved from the receiving position in a direction in which the medium is discharged by the discharge section, and then moved downward to the discharge position.

3. The recording apparatus according to claim 1, wherein when the post-processing unit is located at the discharge position, an upper surface of the post-processing unit serves as a medium receiving surface that receives the medium that is discharged from the discharge section.

4. The recording apparatus according to claim 3, wherein the discharge position of the post-processing unit is lowered depending on a load of media stacked on the upper surface of the post-processing unit.

5. The recording apparatus according to claim 1, wherein the discharge position of the post-processing unit is located along the direction in which the medium is discharged from the discharge position with respect to the receiving position.

6. The recording apparatus according to claim 5, wherein the discharge position of the post-processing unit is changed depending on the length of the medium in the direction in which the medium is discharged from the discharge section.

7. The recording apparatus according to claim 1, further comprising:
a controller configured to control the movement of the post-processing unit, wherein
the controller is configured to control the movement of the post-processing unit depending on the size of the medium.

8. The recording apparatus according to claim 7, wherein when the medium of a size that is not processed in the post-processing unit is to be transported and the post-processing unit is to be located at the receiving position, the controller causes the post-processing unit to move from the receiving position to the discharge position.

9. The recording apparatus according to claim 7, wherein the controller sets the receiving position as a home position of the post-processing unit.

10. The recording apparatus according to claim 1, further comprising:
a controller configured to control the movement of the post-processing unit, wherein
the controller controls the movement of the post-processing unit depending on the content recorded on the medium by the recording section.

11. The recording apparatus according to claim 10, wherein the recording section comprises a liquid discharge head configured to discharge a liquid onto the medium for recording, and
when a duty value that is an amount of liquid to be applied per unit area by the liquid discharge head onto the medium exceeds a predetermined value, the controller causes the post-processing unit to move to the discharge position to discharge the medium to the outside of the post-processing unit.

12. The recording apparatus according to claim 1, further comprising:
a controller configured to control movement of the post-processing unit; and
a position detector configured to detect a position of the post-processing unit, wherein
when the controller determines, based on information detected by the position detector, that the post-processing unit is located at a position between the receiving position and the discharge position, the controller provides the information about the location.

13. The recording apparatus according to claim 1, further comprising:
a controller configured to control movement of the post-processing unit; and
a position detector configured to detect a position of the post-processing unit, wherein
when the controller determines, based on information detected by the position detector, that the post-processing unit is located at a position between the receiving position and the discharge position, the controller causes the post-processing unit to move to the receiving position or the discharge position.

14. A recording apparatus comprising:
an apparatus body including a recording section configured to record onto a medium and a
discharge section configured to discharge the medium recorded by the recording section; and
a post-processing unit attached to the apparatus body, the post-processing unit being configured
to receive the medium discharged from the discharge section and perform post-processing, wherein
the post-processing unit is configured to be moved between a receiving position at which the
medium discharged from the discharge section is to be received and a discharge position to which the post-processing unit is moved from the receiving position and at which the medium discharged from the discharge section is discharged to an outside of the post-processing unit without being received into the post-processing unit; and
the discharge position of the post-processing unit is higher than the receiving position.

15. The recording apparatus according to claim 14, wherein the post-processing unit is configured to be moved from the receiving position in a direction in which the medium is discharged by the discharge section, and then moved upward to the discharge position.

16. A recording apparatus comprising:
an apparatus body including;
a recording section configured to record onto a medium;
a discharge section configured to discharge the medium recorded by the recording section; and
a linear guide that is substantially horizontal;
a discharge tray configured to receive the medium discharged from the discharge section; and
a post-processing unit attached to the apparatus body, the post-processing unit being configured to move along the linear guide in a horizontal direction, the post-processing unit being configured to receive the medium discharged from the discharge section and perform post-processing, wherein
the post-processing unit is configured to be moved between a receiving position at which the medium discharged from the discharge section is to be received and a discharge position to which the post-processing unit is moved from the receiving position, wherein the discharge tray receives the medium discharged from the discharge section when the post-processing unit is located at the discharge position, wherein the medium discharged from the discharge section to the discharge tray is placed in a range between a back face of the post-processing unit and the discharge section.

17. The recording apparatus according to claim 16, wherein a leading edge of the medium discharged from the discharge section is aligned by the back face of the post-processing unit.

* * * * *